(No Model.) 3 Sheets—Sheet 1.
M. T. REEVES & J. N. KAILOR.
STRAW CARRIER ATTACHMENT FOR THRASHING MACHINES.
No. 557,701. Patented Apr. 7, 1896.
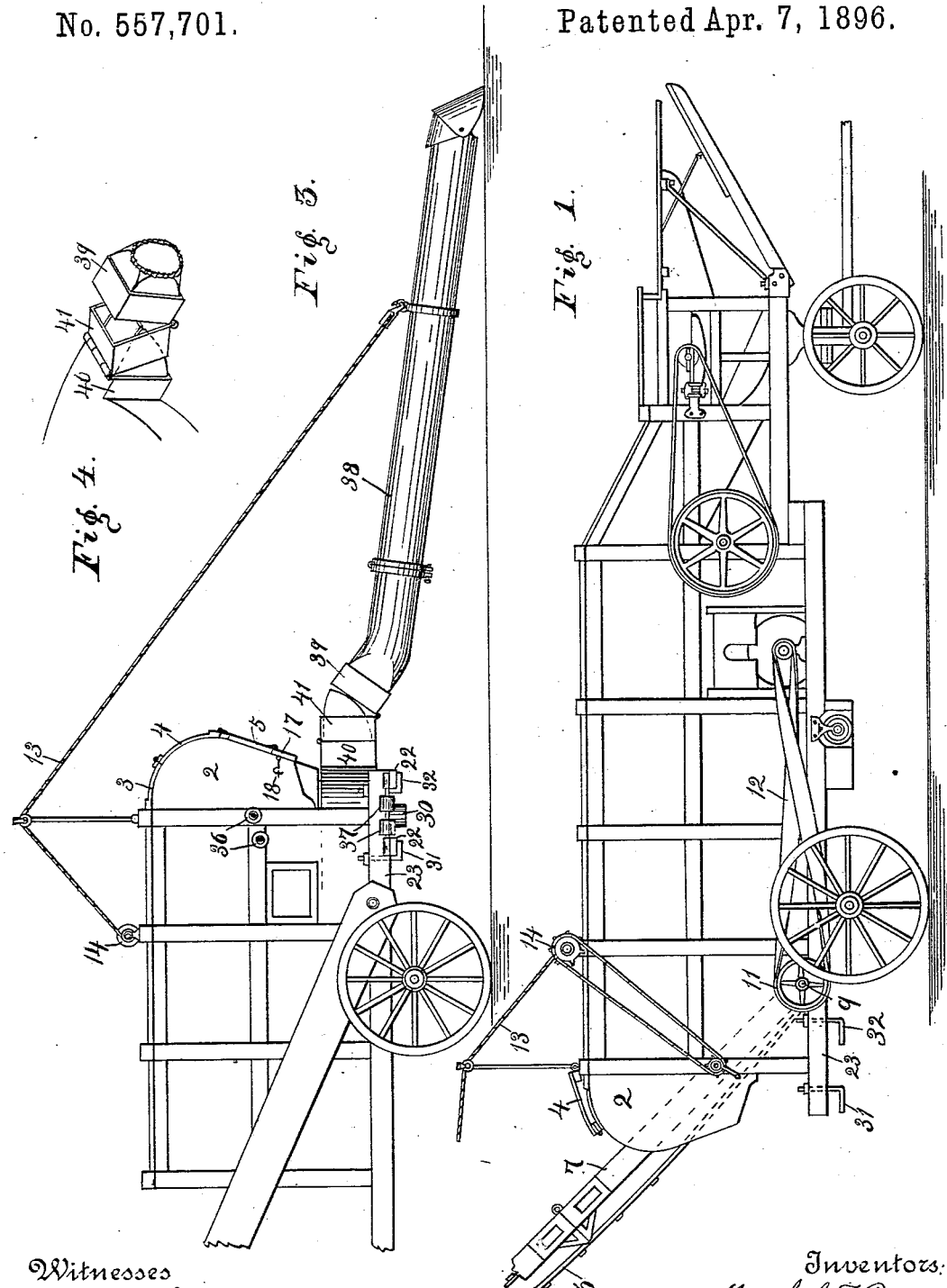
Witnesses
V. M. Hood.
M. V. Hood.
Inventors.
Marshal T. Reeves.
John N. Kailor.
By Attorney
H. P. Hood.

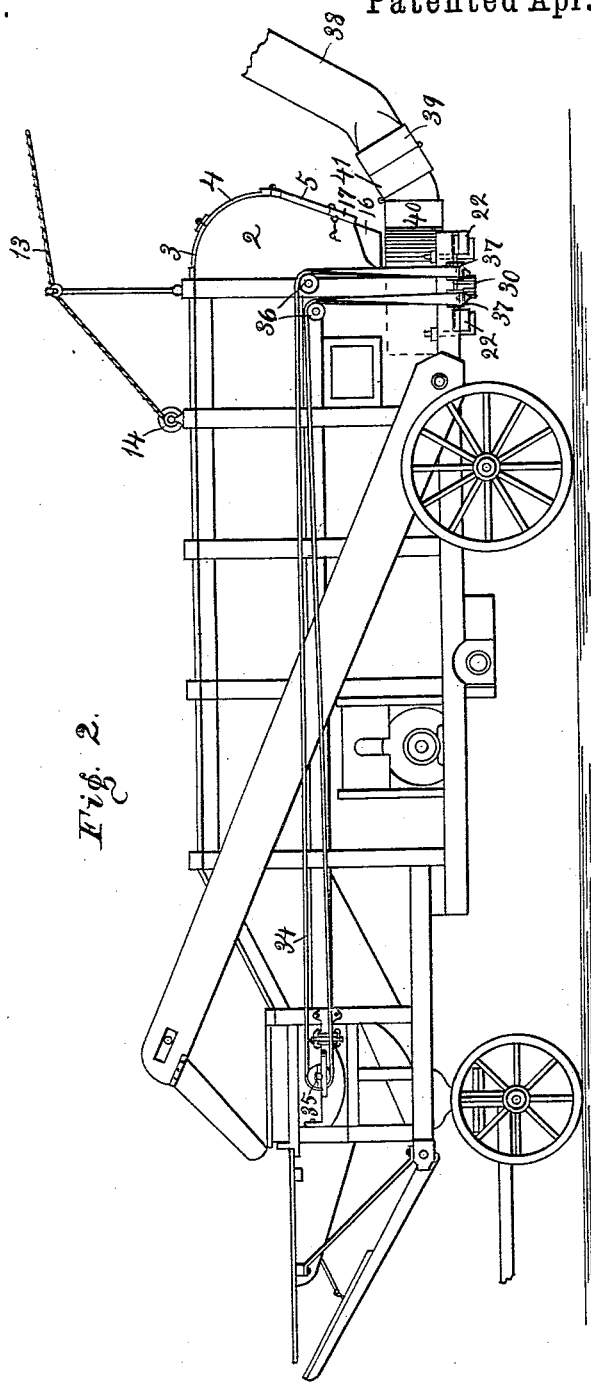

(No Model.) 3 Sheets—Sheet 3.

M. T. REEVES & J. N. KAILOR.
STRAW CARRIER ATTACHMENT FOR THRASHING MACHINES.

No. 557,701. Patented Apr. 7, 1896.

Witnesses
C. M. Hood.
M. V. Hood.

Inventors:
Marshal T. Reeves.
John N. Kailor.
By Attorney
H. P. Hood.

UNITED STATES PATENT OFFICE.

MARSHAL T. REEVES AND JOHN N. KAILOR, OF COLUMBUS, INDIANA, ASSIGNORS TO REEVES & CO., OF SAME PLACE.

STRAW-CARRIER ATTACHMENT FOR THRASHING-MACHINES.

SPECIFICATION forming part of Letters Patent No. 557,701, dated April 7, 1896.

Application filed March 1, 1895. Serial No. 540,160. (No model.)

*To all whom it may concern:*

Be it known that we, MARSHAL T. REEVES and JOHN N. KAILOR, citizens of the United States, residing at Columbus, in the county of Bartholomew and State of Indiana, have invented a new and useful Improvement in Straw-Carrier Attachments for Thrashing-Machines, of which the following is a specification.

Our invention relates to the straw-carriers of thrashing-machines. As is well known, thrashing-machines are, in many parts of the country, controlled by operators who take them from place to place to serve a large circle of patrons. Some of these patrons prefer to have the straw delivered from the thrashing-machine by means of the old and well-known endless-belt straw-carrier, while others prefer to have the straw delivered by means of the more modern pneumatic straw-carrier.

The object of our improvement is therefore to provide means whereby the ordinary endless-belt straw-carrier or a pneumatic straw-carrier may be quickly attached to or dismounted from the thrashing-machine, so as to be used interchangeably on the same machine, as occasion requires, the construction of the rear end of the thrashing-machine and the respective straw-carriers being so modified as to provide for the proper mounting and driving of either straw-carrier.

The accompanying drawings illustrate our invention.

Figure 5:
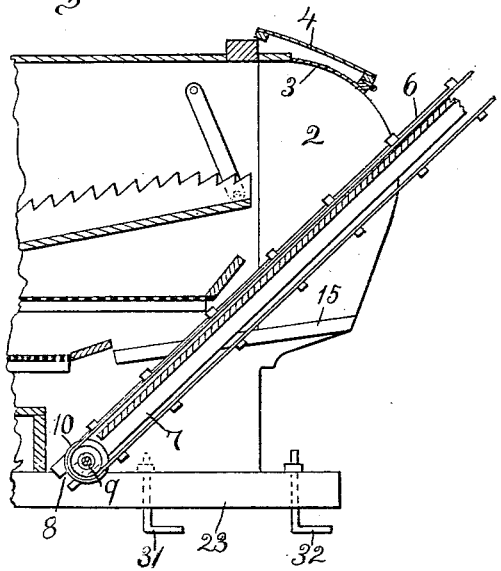
Figure 6:
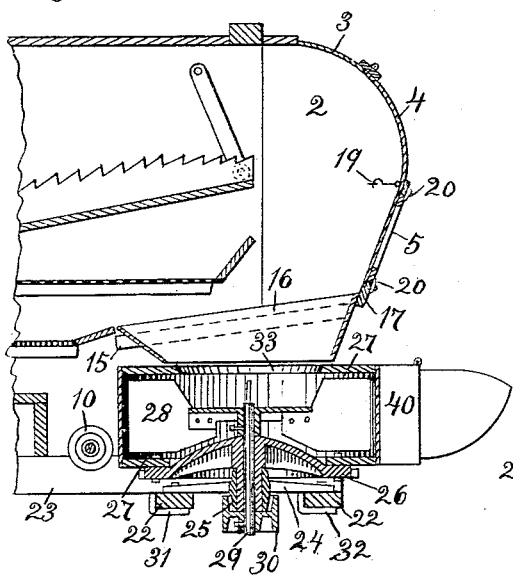
Figure 7:
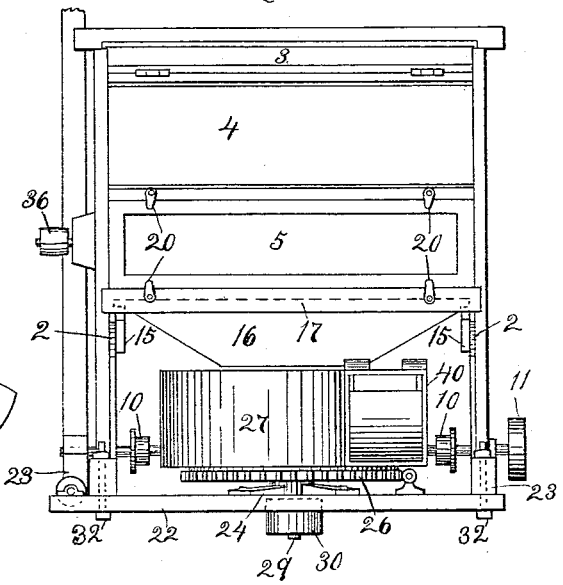

Figure 1 represents a side elevation of a thrashing-machine having our improvement and showing the ordinary endless-belt carrier in position. Fig. 2 represents an elevation of that side of the machine opposite the one shown in Fig. 1 and showing the pneumatic carrier in position. Fig. 3 represents a partial side elevation illustrating the manner of jointing the adjustable discharge-tube to the fan-chamber of the pneumatic straw-carrier, so that it may rest upon the ground preparatory to raising it into working position. Fig. 4 represents a view in perspective of said joint. Fig. 5 represents a longitudinal section of the rear end of the thrashing-machine, showing the endless-belt straw-carrier in position. Fig. 6 represents a similar section showing the pneumatic straw-carrier in position, the discharge-tube being omitted. Fig. 7 represents a rear end elevation of the same.

In the drawings, 2 2 indicate extensions of the sides of the machine-casing beyond the separating mechanism. The upper edges of said extensions are curved rearwardly and downwardly, and are then inclined forward, as shown. Said extensions are connected at their outer edges by a fixed covering 3, to which are hinged a flexible door 4, formed of sheet-iron, and a removable door 5. When the endless-belt straw-carrier 6 is used, the lower end of the straw-carrier frame 7 is slotted, as at 8, so as to embrace and rest upon a shaft 9, mounted in the lower part of the thrashing-machine casing, said shaft being provided with pulleys 10 10, over which the carrier-belts pass, and a driving-pulley 11, which is connected by a belt 12 to one of the running shafts of the machine. The free end of the carrier is supported by a rope 13, extending from a windlass 14, mounted on the machine-casing in the usual well-known manner. With this construction, when it is desired to remove the endless-belt carrier it is only necessary to unlace the carrier-belts and lift the frame from the shaft.

To fit the thrasher-casing to receive the pneumatic straw-carrier, the inner sides of the extensions 2 2 are each provided with a cleat 15, which supports a hopper 16, arranged below the separating mechanism and adapted to be slid into position through the open rear end of the thrasher-casing. The outer upper edge of said hopper is provided with a cross-bar 17, which engages the outer edges of the casing, and is secured thereto at each end by a hook 18. Flexible door 4 is now closed and fastened by a hook 19, and the removable door 5 is placed in position and held by turn-buttons 20 to close the space between the lower edge of the door 4 and bar 17. An inclosed chamber is thus formed which is adapted to direct the straw and chaff from the separating mechanism of the thrashing-machine to the hopper 16. The pneumatic straw-carrier is of the horizontal fan type, and is mounted upon a portable frame, which is adapted to be quickly secured to and removed from the thrashing-machine casing. Said frame consists of a pair of timbers 22 22, which are adapted to extend across and project beyond the sills 23 of the machine-casing, and a central casting 24, which is bolted to the upper surface of the two timbers, thus firmly connecting them and forming a bearing for the hollow spindle 25 of the turn-table 26, on which the fan-casing 27 is mounted. The fan 28 is secured to the vertical shaft 29, which extends through the hollow spindle of the turn-table, and is provided at its lower end with a driving-pulley 30. The portable frame, carrying the turn-table and fan-chamber, is secured to the thrashing-machine casing, so as to be quickly attached to or detached therefrom by means of angle-bolts 31 and 32, which pass loosely through the sills 23 and embrace with their angular lower ends the timbers 22. The arrangement of bolts 31 and 32 and timbers 22 is such that the open eye 33 of the fan-chamber is supported directly beneath and closely adjacent to the under side of the hopper 16. Motion is imparted to the fan by means of a belt 34, extending from the thrashing-cylinder shaft 35 over guide-pulleys 36, mounted on the machine-casing, and guide-pulleys 37, mounted on the projecting ends of timbers 22, to the driving-pulley 30. In this class of pneumatic straw-carriers the discharge-tube 38 has usually been constructed at its lower end with a single rectangular section 39, which has been hinged at its upper edge to the discharge-trunk 40 of the fan-chamber. Such a construction would permit the necessary movements of the tube for the purposes of stacking, but would not permit the free end of the tube to rest upon the ground or to fall below the level of the fan-chamber.

To permit the convenient handling of the fan-chamber in connecting it to and dismounting it from the thrashing-machine, it is necessary to lower the free end of the discharge-tube so that it may rest upon the ground, as shown in Fig. 3, preparatory to disconnecting the tube from the fan-chamber. To permit this movement, we interpose between the rectangular fan-chamber trunk 40 and the rectangular portion 39 of the discharge-tube a third rectangular tubular section 41, which is hinged at its upper edge at one end to the trunk 40 and at its lower opposite edge and end to the discharge-tube section 39. This construction is necessary not only for the purpose of convenient mounting of the pneumatic straw-carrier, but to guard against the wrenching of the whole fixture away from the thrasher-casing by a sudden accidental lowering of the discharge-tube through breakage or disconnecting of the rope 13.

It will be readily understood that by the above-described modifications of a thrashing-machine casing and the straw-carrying attachments the operator is enabled to change quickly and easily from one style of straw-carrier to the other and satisfy all classes of patrons.

We claim as our invention—

1. The combination of the thrasher-casing having its sides extended beyond the separating mechanism substantially as shown and described, the hopper detachably mounted between the sides of the casing and below the separating mechanism, and removable means for connecting the edges of the extended sides above said hopper, whereby an inclosed chamber, adapted to direct the straw from the separating mechanism to the hopper, is formed, a fan-chamber detachably mounted on the thrashing-machine casing below said hopper, and a pneumatic discharge-tube leading from said fan-chamber, all of the parts being arranged substantially as specified in order that the pneumatic stacking mechanism may be easily removed and an ordinary endless-belt stacking mechanism be substituted therefor.

2. The combination of the thrasher-casing having its sides extended beyond the separating mechanism, the outer edges of said extensions being curved rearwardly and downwardly and then inclined forward substantially as shown and described, the flexible door, 4, arranged to engage said curved edges, the removable door 5, the hopper provided with the cross-bar 17 and mounted on slides 15 secured to the sides of the thrasher-casing below the separating mechanism, the fan-chamber detachably mounted on the thrashing-machine casing below said hopper, the fan mounted in said fan-chamber, and the pneumatic discharge-tube leading from the fan-chamber, all arranged to coöperate substantially as set forth.

3. In a straw-carrier attachment for thrashing-machines, the combination of the thrasher-casing provided with a hopper detachably connected thereto below the separating mechanism, and a closed chamber above said hopper and beyond the separating mechanism, the portable frame consisting of cross-timbers 22, 22, and the casting 24 connecting said cross-timbers and forming a bearing for the turn-table, the turn-table mounted in said bearing, the fan-chamber secured to said turn-table, the fan mounted in said fan-chamber, and means for detachably securing said portable frame to the thrashing-machine casing below the hopper, all substantially as set forth.

4. In a straw-carrier attachment for thrashing-machines, the combination of the thrasher-casing, the portable frame detachably secured thereto the fan-chamber provided with the rectangular discharge-trunk 40 and mounted on said frame, the discharge-tube having a rectangular portion 39, and the intermediate tubular section 41 hinged at diagonally-opposite corners to said discharge-tube and to said trunk, all substantially as and for the purpose set forth.

MARSHAL T. REEVES.
JOHN N. KAILOR.

Witnesses:
C. S. WAY,
W. F. POERTNER.